United States Patent
Kanda

(10) Patent No.: US 8,078,675 B2
(45) Date of Patent: Dec. 13, 2011

(54) SERVER UNIT, CLIENT UNIT, SERVER-BASED COMPUTING SYSTEM, SERVER CONTROL METHOD, CLIENT CONTROL METHOD, AND RECORDING MEDIUM

(75) Inventor: Hirokazu Kanda, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 175 days.

(21) Appl. No.: 12/432,879

(22) Filed: Apr. 30, 2009

(65) Prior Publication Data

US 2009/0287769 A1  Nov. 19, 2009

(30) Foreign Application Priority Data

May 13, 2008  (JP) ................. 2008-125789

(51) Int. Cl.
*G06F 15/16* (2006.01)
(52) U.S. Cl. .......... 709/203; 715/810
(58) Field of Classification Search .......... 709/203, 709/201, 202, 204–207, 220–222; 715/700–866; 400/89, 90, 472–496; 341/20, 22, 23
See application file for complete search history.

(56) References Cited

U.S. PATENT DOCUMENTS

2006/0179088 A1* 8/2006 Kang ............... 708/142
2007/0016877 A1* 1/2007 Shirakawa et al. .......... 715/810

FOREIGN PATENT DOCUMENTS

JP  2003085256  3/2003
JP  2005-228227  8/2005

OTHER PUBLICATIONS

Japanese Office Action dated May 11, 2010 corresponding to U.S. Appl. No. 12/432,879 filed on Apr. 30, 2009.

* cited by examiner

*Primary Examiner* — Wing Chan
*Assistant Examiner* — Ruolei Zong
(74) *Attorney, Agent, or Firm* — Turocy & Watson, LLP

(57) ABSTRACT

A display-operation setting database for defining key arrangements on the input unit (soft keyboard) of a client according to the type of an application which runs on a server is stored in the server beforehand. When the application running on the server is changed according to an input event from the client, definition information on the key arrangement corresponding to the operation application is read from the stored database and transmitted to the client. The key arrangement displayed on the input unit (soft keyboard) of the client is changed to a key arrangement corresponding to the operation application on the basis of the definition information received from the server. Then, a key signal corresponding to the user operation on the basis of the key arrangement is transmuted to the server, thereby specifying the processing of the operation application.

17 Claims, 8 Drawing Sheets

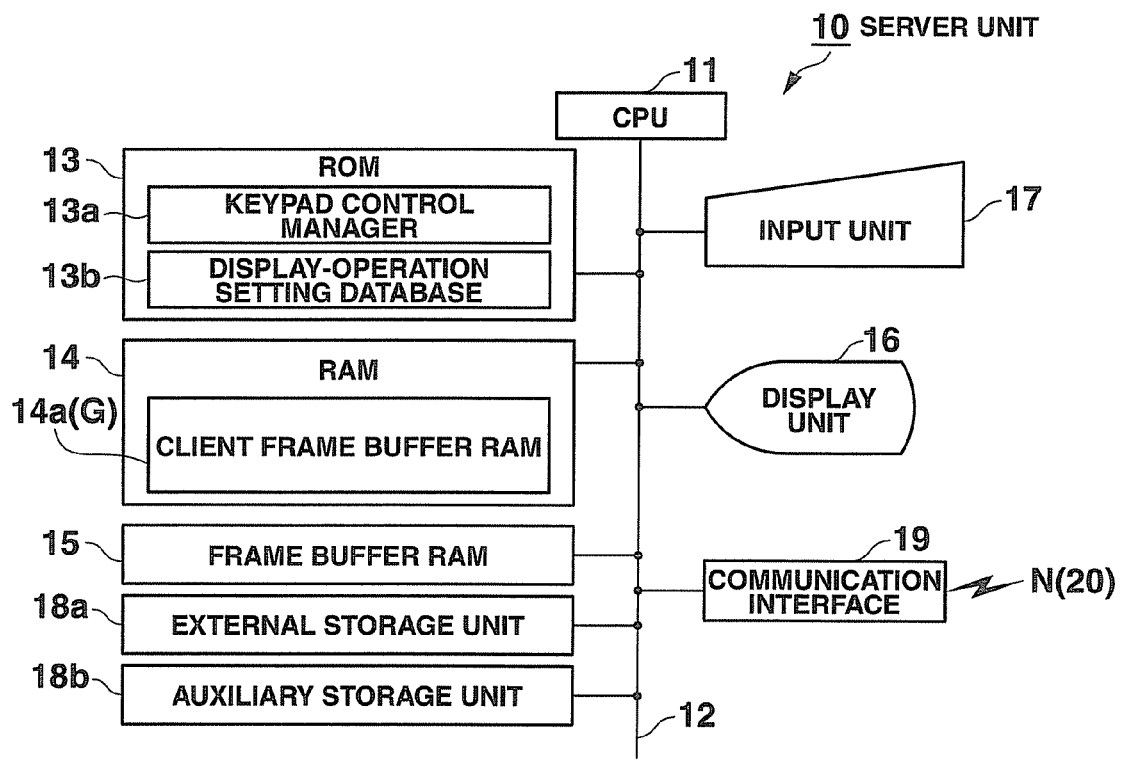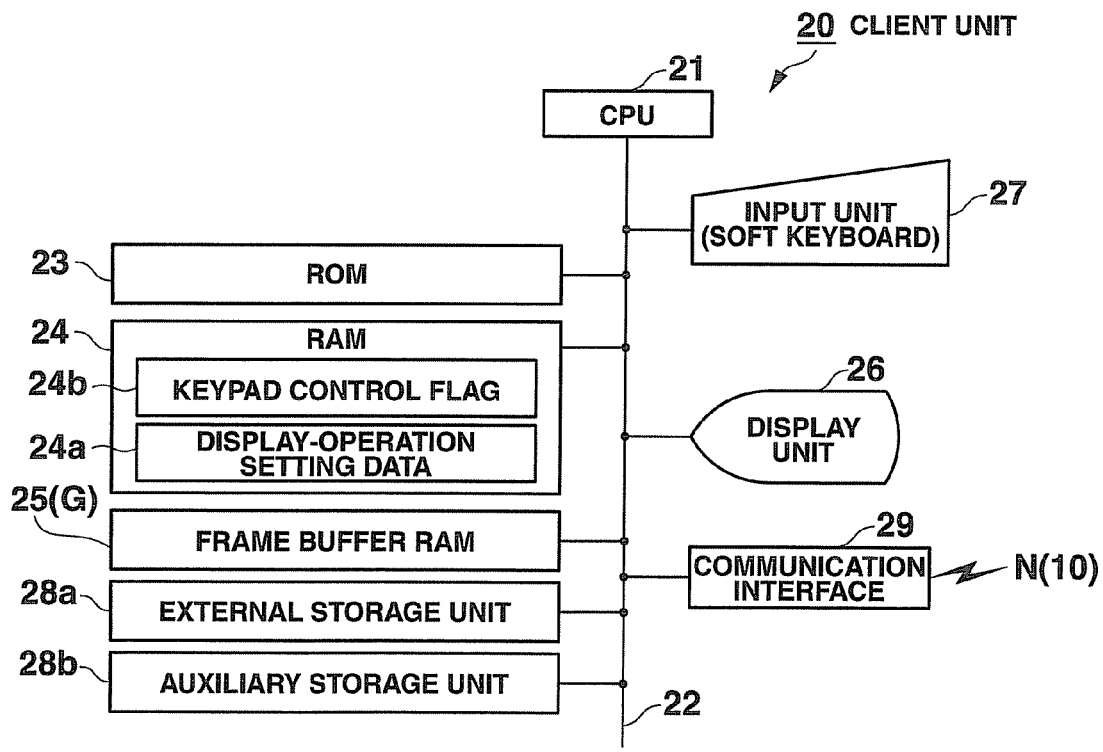

FIG.6

| APPLICATION NAME | APPLICATIONS ID | COMMAND ID | DISPLAY POSITION | DISPLAY CONTENT | PROCESSING METHOD |
|---|---|---|---|---|---|
| TEXT | 1 | 1 | LEFT 1 | NEW | SENDING A MESSAGE |
| | | 2 | MIDDLE 1 | SAVE | SENDING A MESSAGE |
| | | 3 | RIGHT 1 | CLOSE | SENDING A MESSAGE |
| | | 4 | LEFT 2 | UNDO | SENDING A MESSAGE |
| | | 5 | MIDDLE 2 | SEARCH | SENDING A MESSAGE |
| | | 6 | RIGHT 2 | HELP | SENDING A MESSAGE |
| | | 7 | RIGHT 4 | END | SENDING A MESSAGE |
| BROWSER | 2 | 1 | LEFT 1 | RETURN | ISSUING KEYS (ALT+←) |
| | | 2 | MIDDLE 1 | ABORT | ISSUING A KEY (ESC) |
| | | 3 | RIGHT 1 | GO | ISSUING KEYS (ALT+→) |
| | | 4 | LEFT 2 | HOME | ISSUING KEYS (ALT+HOME) |
| | | 5 | MIDDLE 2 | UPDATE | ISSUING A KEY (F5) |
| | | 6 | RIGHT 2 | SEARCH | ISSUING KEYS (CTRL+F) |
| | | 7 | LEFT 3 | BOOKMARK | ISSUING KEYS (CTRL+D) |
| | | 8 | MIDDLE 3 | HELP | ISSUING A KEY (F1) |
| | | 9 | RIGHT 3 | END | SENDING A MESSAGE |

13b DISPLAY-OPERATION SETTING DATABASE

SERVER UNIT, CLIENT UNIT, SERVER-BASED COMPUTING SYSTEM, SERVER CONTROL METHOD, CLIENT CONTROL METHOD, AND RECORDING MEDIUM

CROSS-REFERENCE TO RELATED APPLICATIONS

This application is based upon and claims the benefit of priority from prior Japanese Patent Application No. 2008-125789, filed May 13, 2008, the entire contents of which are incorporated herein by reference.

BACKGROUND OF THE INVENTION

1. Field of the Invention

This invention relates to a server unit, a client unit, a server-based computing system, a server control method, a client control method, a server control program, and a client control program in a server-based computing (SBC) system which causes the server unit to activate and execute a desired application program in response to a remote operation at the client unit in a client-server system.

2. Description of the Related Art

In the SBC system, a key output signal, a mouse output signal, or the like corresponding to the user operation on a client unit is generally transmitted as an event signal to a server unit each time the signal is generated. Then, the server unit runs an application program corresponding to the event signal from the client unit and transfers the resulting drawing data to the client unit each time the drawing is updated, thereby causing the client unit to display the drawing data.

As described above, in the SBC system, each time the user operates the client unit, the event signal generated at that time is transmitted to the server units. For this reason, in the server unit which processes the event signals from many client units, the burden of processing the event signals increases, which decreases the operation response when viewed from the client unit.

A conventional SBC system is such that, in a communication between a server unit and a client unit, commands are defined in graphical user interface (GUI) components and the property value of a GUI component and a command representing the user operation for the GUI component are transmitted, thereby reducing the amount of communication data and realizing a fast GUI response (e.g., Jpn. Pat. Appln. KOKAI Publication No. 2005-228227).

In recent years, mobile terminals have been used widely as client units of the SBC system. Since the key input unit of the mobile terminal is provided in a small space, the types of keys are restricted. Accordingly, in a case where the server unit gets various programs running according to an input event corresponding to the user operation, when a frequently used command, such as "Favorites", "Back" or "Forward" in a Web browser program or "New", "Save" or "Undo" in a text creation program, is input, the command cannot be input by a key operation and has to be input only by specifying the shortcut for each command displayed on the display screen with a pointer and pressing the enter key.

Consequently, this causes a problem: a pointer operation on the small display screen of a mobile terminal is particularly difficult to understand, troublesome, and liable to be erroneous.

BRIEF SUMMARY OF THE INVENTION

An object of the invention is to provide a server unit, a client unit, a server-based computing system, a server control program storage medium, a client control program storage medium, a server control method, and a client control method which enable various commands to be input easily by a key operation on a client unit while various application programs are running on the server unit in an SBC system.

According to an aspect of the invention, there is provided a server unit which runs a program on the basis of an input event from a client unit via a network, creates screen information corresponding to the input event, and transmits the screen information to the client unit, the server unit comprising: a key information storage module which stores key arrangement information for displaying an input unit of the client unit according to the type of the application program, operation information on each key, and process specification information for the application program corresponding to the operation of each key in such a manner that these items of information are caused to correspond to one another; a key information transmission module which, when the application program is changed on the basis of the input event from the client unit, reads the key arrangement information and operation information on each key stored in the key information storage module according to the changed application program and transmits these items of information to the client unit; and a process execution control module which causes the changed application program to execute the process according to the process specification information stored in the key information storage module so as to correspond to the key operation information received as an input event from the client unit.

According to another aspect of the invention, there is provided a client unit which transmits an input event corresponding to a user operation to a server unit connected via a network and receives screen information created according to an application program run on the server unit according to the input event, the client unit comprising: a key information reception module which receives key arrangement information corresponding to an application program now in operation and operation information on each key from the server unit; a key display control module which, according to the key arrangement information received by the key information reception module, displays an arrangement pattern for the keys as an input unit; and a key operation information transmission module which transmits, as an input event to the server unit, key operation information received by the key information reception module in such a manner that the key operation information is caused to correspond to the keys to be operated according to a user operation on the key arrangement pattern displayed by the key display control module.

According to still another aspect of the invention, there are provided a recording medium which causes a computer to realize the main functions of the server unit of the invention and a recording medium which causes a computer to realize the main functions of the client unit of the invention.

With the invention, it is possible to input various commands easily by a key operation on a client unit while various application programs are running on a server unit in the SBC system.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a block diagram showing a circuit configuration of a server unit 10 in the SBC system;

FIG. 3 is a block diagram showing a circuit configuration of a client unit 20 in the SBC system;

FIG. 6 shows the contents of a display-operation setting database 13b prestored in a ROM 13 of the server unit 10;

DETAILED DESCRIPTION OF THE INVENTION

Hereinafter, referring to the accompanying drawings, an embodiment of the invention will be explained.

Figure 1:
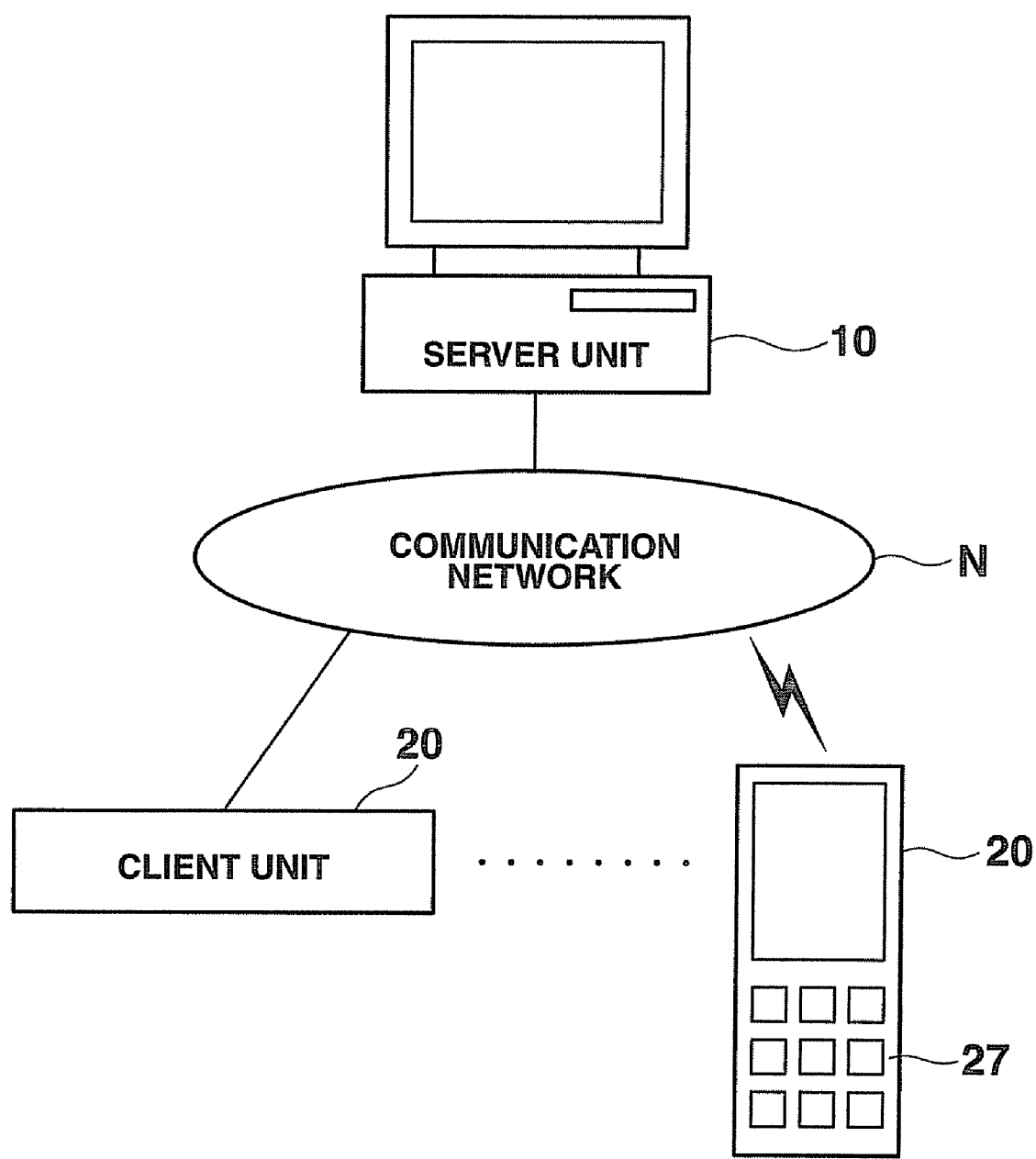
FIG. 1 is a block diagram showing the configuration of a server-based computing (SBC) system according to an embodiment of the invention.

FIG. 1 is a block diagram showing the configuration of a server-based computing (SBC) system according to an embodiment of the invention.

The SBC system comprises a server unit 10 and a plurality of client units (thin clients) 20 which are connected to a network N composed of a local area network (LAN) and wide area network (WAN).

The server unit 10 has various application programs, including a text creation program, a Web browser program, a spreadsheet program, and a mail handling program. The server unit 10 activates an application program in response to an operation input (or an input event) from a client unit 20 connected to the server unit 10 and executes the processing.

In the server unit 10, the drawing data G for display output created on a client frame buffer RAM 14a (see FIG. 2) as a result of the execution of the application program corresponding to the operation input signal from the client unit 20 is compressed and then transmitted (or transferred) to the accessing client unit 20.

Then, the client unit 20 decompresses the drawing data G transferred from the server unit 10 and develops the decompressed data on a frame buffer RAM 25 (see FIG. 3), thereby displaying the developed data on a display unit 26.

Specifically, each of the client units (thin clients) 20 in the SBC system has not only an input function dealing with the user operations on a keyboard or mouse but also an output function for an LCD display unit and a printer as its main functions. However, each of the client units 20 has none of the various application functions and data file management functions which the server unit 10 has.

Then, the data files created as a result of various types of processing performed at the server unit 10 in response to the operation input (input event) signal from the client unit 20 are stored in a storage unit, such as a magnetic disk, in the server unit 10 or connected to and managed by the server unit 10 on a user account basis or in the form of common files.

The client units 20 are of various types, including the desktop type, the laptop type, the notebook type, and the mobile terminal type. In the embodiment, an explanation will be given, centering on a mobile-terminal client unit 20 with a narrow keyboard.

The input unit (keyboard) 27 of the mobile-terminal client unit 20 is composed of a soft keyboard configured by laying a transparent touch panel on a liquid-crystal panel or of a soft keyboard composed of electronic paper. The key arrangement pattern is displayed on the liquid-crystal panel or the electronic paper.

FIG. 2 is a block diagram showing a circuit configuration of the server unit 10 in the SBC system.

The server unit 10 includes a CPU 11 serving as a computer. A ROM 13, a RAM 14, a frame buffer RAM 15, and a display unit 16 are connected via a bus 12 to the CPU 11.

Furthermore, an input unit 17, such as a keyboard or a mouse, an external storage unit 18a, an auxiliary storage unit 18b, and a communication interface 19 with the client units 20 are connected via the bus 12 to the CPU 11.

The CPU 11 controls the operation of each part of the circuit using the RAM 14 as a working memory according to a system program and various application programs prestored in the ROM 13. In response to, for example, a key input signal from the input unit 17 or a process instruction (input event) signal corresponding to the user operation from the client unit 20 received via the communication interface 19, the CPU 11 activates and executes the various programs.

Further stored in the ROM 13 are a display-operation setting database 13b (see FIG. 6) and a keypad control manager 13a (see FIG. 8) which switches between the key arrangement patterns displayed on the input unit (soft keyboard) 27 of the client unit 20, according to the application program executed in response to the input event from the client unit 20.

In the server unit 10, various items of data created according to the application program executed in response to the input event signal from the client unit 20 are stored into the external storage unit 18a in such a manner that the items of data are caused to correspond to, for example, the user ID. Moreover, client display drawing data G is created using the client frame buffer 14a in the RAM 14. After the drawing data G is compressed, the compressed data is transferred from the communication interface 19 to the client unit 10, which displays the data.

The drawing data to be displayed on the display unit 16 of the server unit 10 is created on the frame buffer RAM 15.

FIG. 3 is a block diagram showing a circuit configuration of the client unit 20 in the SBC system.

The client unit 20 includes a CPU 21 serving as a computer. A ROM 23, a RAM 24, and a frame buffer RAM 25 are connected to the CPU 21 via a bus 22. The drawing data G written in the frame buffer RAM 25 is output to the display unit 26, which displays the data.

Further connected to the CPU 21 via the bus 22 are an input unit (soft keyboard) 27, an external storage unit 28a, an auxiliary storage unit 28b, and a communication interface 29 for communicating with the server unit 10.

The CPU 21 controls the operation of each part of the circuit using the RAM 24 as a working memory according to a system program prestored in the ROM 23. According to, for example, a key input signal from the input unit (soft keyboard) 27, an application response signal from the server unit 10 received via the communication interface 29, or transferred drawing data G, the CPU 21 activates and executes the system program.

In the client unit 20, the various items of data created as a result of the execution of the application program in the server unit 10 are stored suitably into the external storage unit 28a. In addition, the transferred display drawing data G is decompressed and written into the frame buffer RAM 25. The decompressed data is then displayed on the display unit 26.

Stored in the RAM 24 functioning as a working memory are a keypad control flag 24b and display-operation setting data 24a which switches between the key arrangement patterns to be displayed on the input unit (soft keyboard) 27 under the control of the server unit 10.

Figure 4:
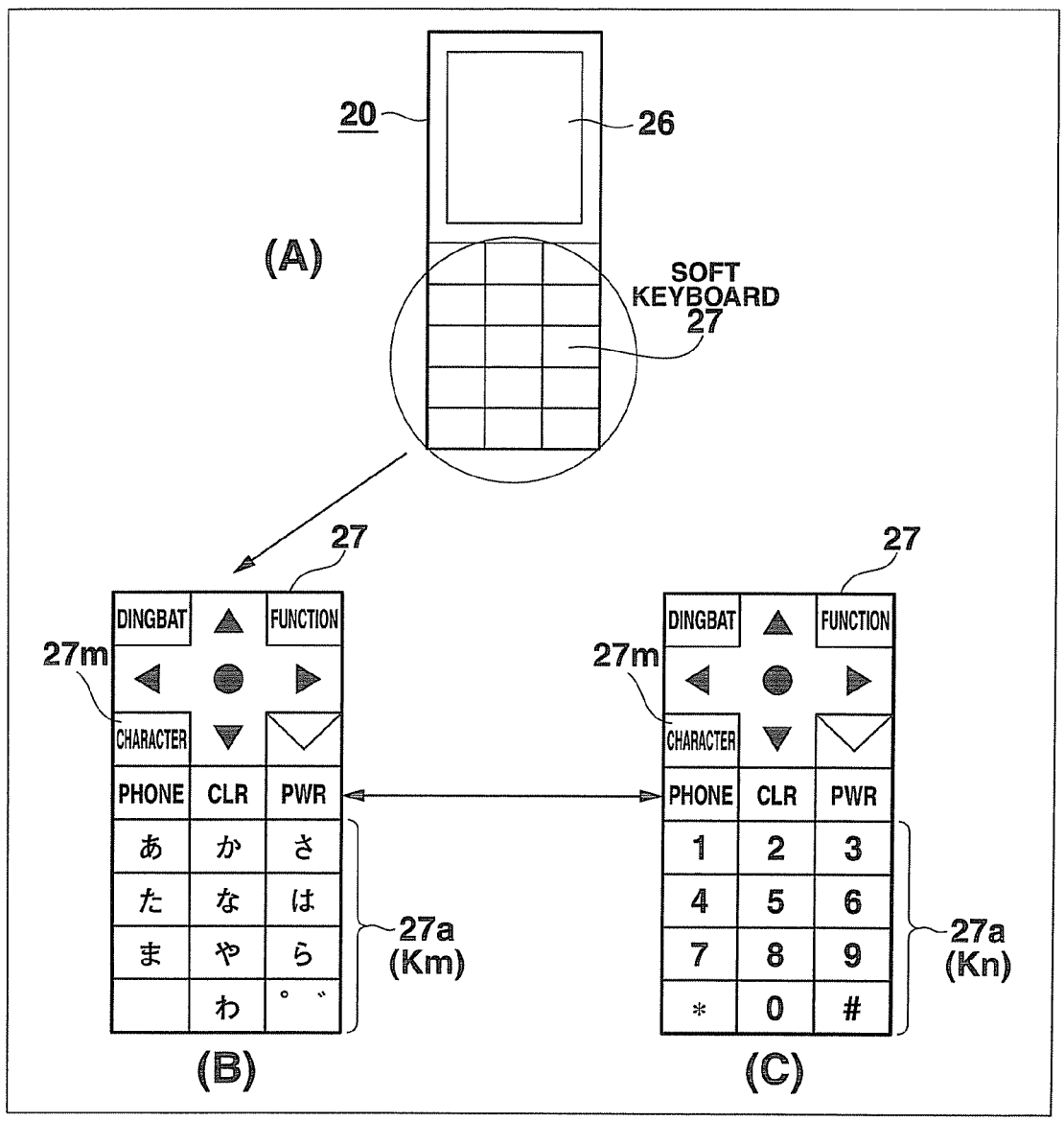
FIG. 4 shows a key arrangement pattern switching display state when characters are input on an input unit (soft keyboard) 27 of the client unit 20.

FIG. 4 shows a key arrangement pattern switching display state when characters are input on the input unit (soft keyboard) 27 of the client unit 20.

The input unit (soft keyboard) 27 of the client unit 20 has 24 key display areas sectionalized into, for example, 8 rows×3 columns. Of them, the types of keys displayed in the 12 key display areas in the upper 4 rows are fixed as keys for, for example, the switching of the basic functions, pointer operations, ON/OFF of the power supply, and incoming call/outgoing call.

The types of keys displayed in the 12 switchable key display areas 27a in the lower 4 rows in the key display area are not only switched by the keypad control manager 13a of the server unit 10 but also switched to either Kana input keys Km as shown by (B) in FIG. 4 or numeric input keys Kn as shown by (C) in FIG. 4 alternately each time, for example, "Character" key 27m is operated under the control of the client unit 20 alone.

The default key arrangement pattern displayed in the switchable key display area 27a on the input unit (soft keyboard) 27 of the client unit 20 is assumed to be, for example, the kana input keys Km shown by (B) in FIG. 4.

Figure 5:
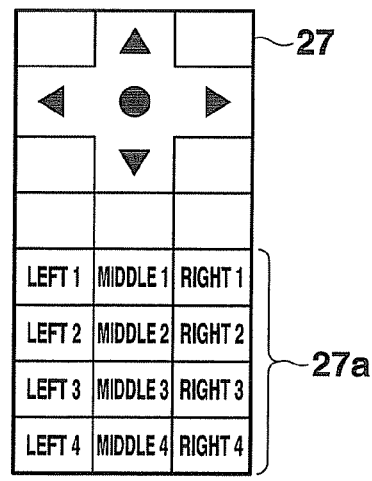
FIG. 5 shows a state where 12 key display positions in a switchable key display area 27a are managed on an input unit (soft keyboard) 27 of the client unit 20.

FIG. 5 shows a state where 12 key display positions in the switchable key display area 27a are managed on the input unit (soft keyboard) 27 of the client unit 20.

The 12 key display positions in the switchable key display area 27a are managed as "Left", "Middle" and "Right" in each row on the input unit (soft keyboard) 27.

FIG. 6 shows the contents of the display-operation setting database 13b prestored in the ROM 13 of the server unit 10.

In the display-operation setting database 13b, for example, the application names "Text" and "Browser" of two application programs "text creation program" and "Web browser program" respectively which operate in response to the input event signal from the client unit 20, key display contents acting as input commands dedicated for the corresponding applications, key display positions, command IDs, and a method of processing the application corresponding to each command are written in such a manner that they are caused to correspond to the application IDs.

Figure 7:
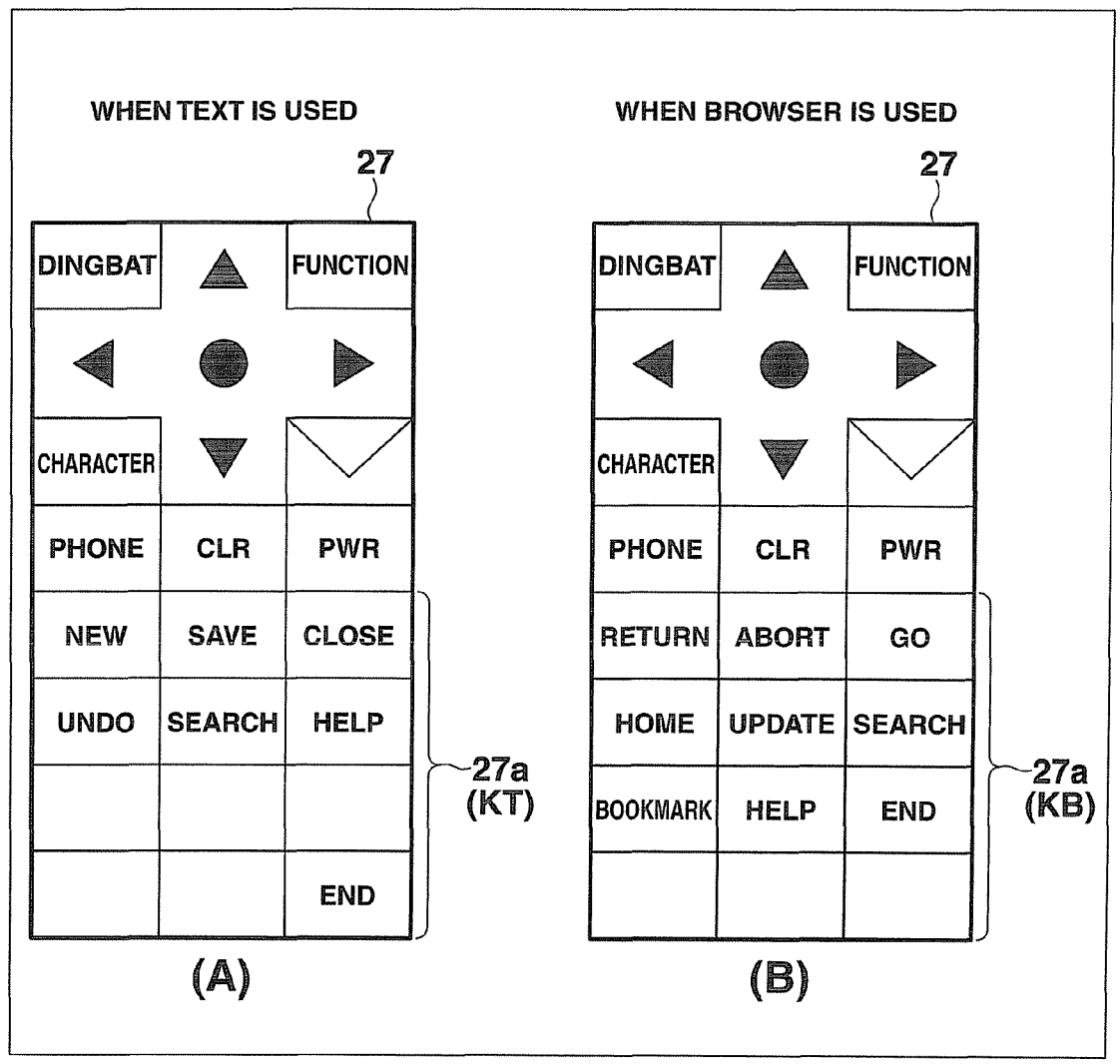
FIG. 7 shows a key arrangement pattern switching display state on the input unit (soft keyboard) 27 of the client unit 20 whose display is controlled on the basis of the display-operation setting database 13b of the server unit 10.

FIG. 7 shows a key arrangement pattern switching display state on the input unit (soft keyboard) 27 of the client unit 20 whose display is controlled on the basis of the display-operation setting database 13b of the server unit 10.

Specifically, when, for example, a text creation program is activated in response to the input event signal from the client unit 20, the application ID, command ID, key display position, and key display contents stored so as to correspond to the application name "Text" in the display-operation setting database 13b are transmitted to the client unit 20, which stores those data items as display-operation setting data 24a. Then, the key arrangement pattern in the switchable key display area 27a on the input unit (soft keyboard) 27 of the client unit 20 is switched to text creation command keys KT as shown by (A) in FIG. 7.

Furthermore, when, for example, the Web browser program is activated in response to the input event signal from the client unit 20, the application ID, command ID, key display position, and key display contents stored so as to correspond to the application name "Browser" in the display-operation setting database 13b are transmitted to the client unit 20, which stores those data items as display-operation setting data 24a. Then, the key arrangement pattern in the switchable key display area 27a on the input unit (soft keyboard) 27 of the client unit 20 is switched to Web browser command keys KB as shown by (B) in FIG. 7.

In the client unit 20, when the text creation command keys KT or Web browser command keys KB on the input unit (soft keyboard) 27 are operated, the application ID and command ID of the display-operation setting data 24a caused to correspond to the key display position of the input key are read out and transmitted as an input event signal to the server unit 10.

In this case, on the basis of the input event signal (application ID+command ID) received from the client unit 20, the server unit 10 selects a command and a processing method from those stored in the display-operation setting database 13b and issues a command for the corresponding application program.

Next, a key arrangement switching control function and method of the client unit 20 corresponding to the operation application in the SBC system configured as described above will be explained.

Figure 8:
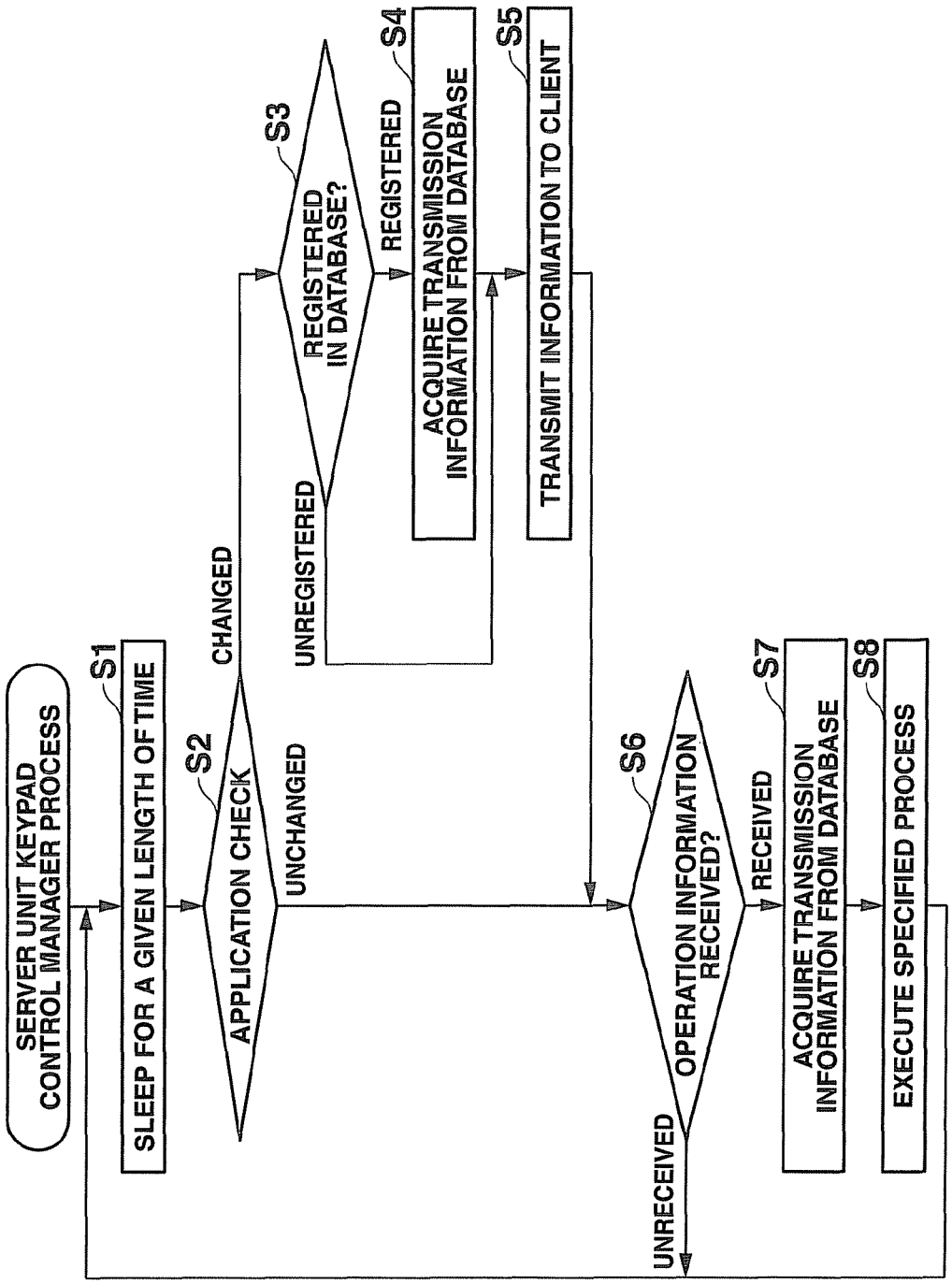
FIG. 8 is a flowchart for a keypad control manager process (13a) on the server unit 10 in the SBC system.

FIG. 8 is a flowchart for a keypad control manager process (13a) on the server unit 10 in the SBC system.

In the keypad control manager process (13a) at the server unit 10, the processes explained below will be carried out each time an elapse of a relatively short specific length of time (e.g., 1 sec) is determined (step S1).

Specifically, if an elapse of the specific time has been determined while an application program corresponding to the input event signal from the client unit 20 is running on the server unit 10 (step S1), the type of the application program now in operation is detected and it is determined whether the program has been changed (step S2).

If it has been determined that the type of the application program now in operation has been changed, it is determined whether display-operation setting data corresponding to the changed application program has been registered in the display-operation setting database 13b (see FIG. 6) prestored in the ROM 13 (step S3).

For example, when the Web browser program has been activated in response to the input event signal from the client unit 20, if it has been determined that the display-operation setting data corresponding to the Web browser program has been registered in the display-operation setting database 13b (see FIG. 6) (step S3 [registered]), the application ID "1", command IDs "1" to "7", key display positions "Left 1" to "Right 4", Key display contents "New" to "End" corresponding to the application name "Browser" activated this time are read from the display-operation setting database 13b (step S4) and transmitted as keypad control information to the client unit 20 (step S5).

When in step S3, for example, an application program has been activated in response to the input event signal from, the client unit 20, if it has been determined that display-operation setting data corresponding to the application program has not been registered in the display-operation setting database 13b (see FIG. 6) (step S3 [unregistered]), unregistered keypad control information is transmitted to the client unit 20 (step S5).

Then, if the keypad control information corresponding to the change of the application program is transmitted to the client unit 20 according to the processes in step S2 to step S5, or if it has been determined in step S2 that the type of the application program now in operation has not been changed, it is determined again whether the input event signal corresponding to the user operation from the client unit 20 has been received (step S6).

If it has been determined that the input event signal corresponding to the user operation from the client unit 20 has been received, a processing method corresponding to the contents of the input event signal is acquired from the display-operation setting database 13b (see FIG. 6) (step S7) and the corresponding process is carried out (step S8).

Specifically, for example, when the application program now in operation is a Web browser program and an input event signal (application ID "2"+command ID "4") corresponding to the user operation of "Home" key in the Web browser command keys KB (see (B) in FIG. 7) displayed on the input unit (soft keyboard) 27 of the client unit 20 has been received, a processing method (key issue [Alt+Home]) corresponding to the contents of the input event signal (application ID "2" +command ID "4") is acquired from the display-operation setting database 13b (see FIG. 6) (step S7) and the corresponding key signal (Alt+Home) is sent to the Web browser in operation, thereby performing the corresponding process (step S8).

In this case, screen data G on the home page at an URL address preset for the client unit 20 is acquired and is not only developed on the client frame buffer RAM 14a but also transmitted as screen update information to the client unit 20.

Figure 9:
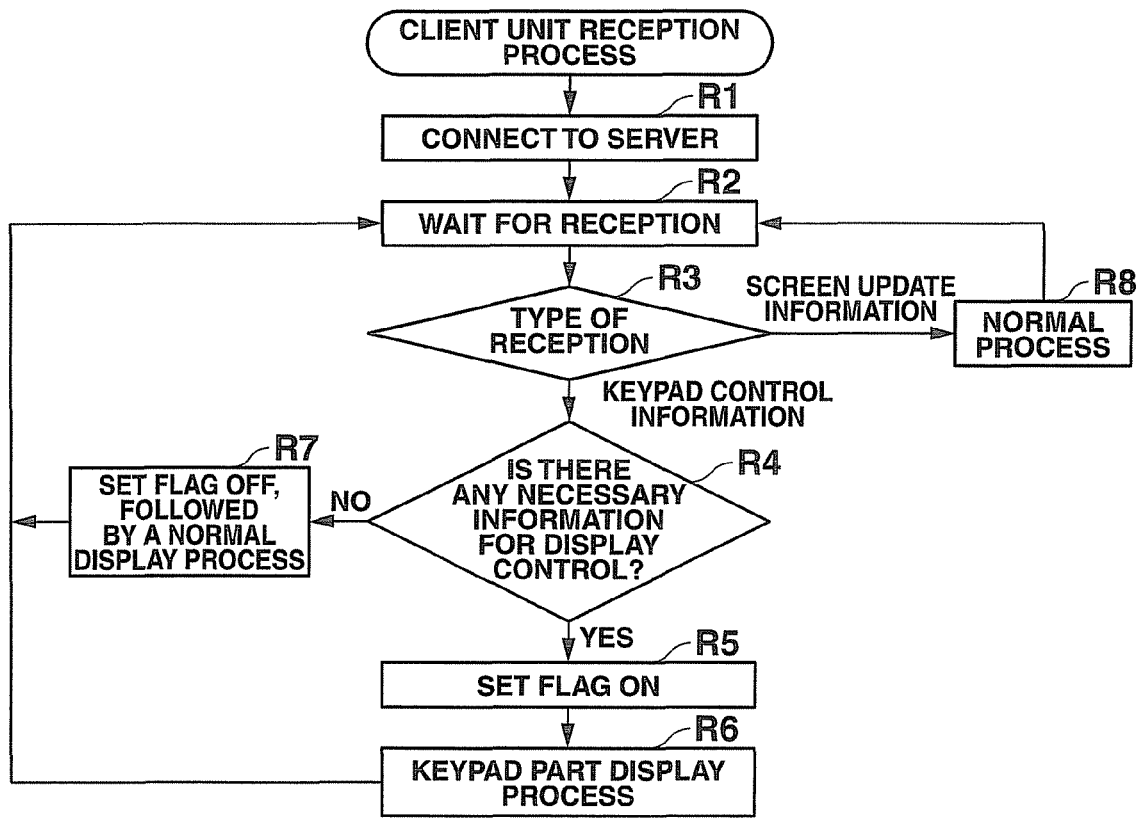
FIG. 9 is a flowchart for a receiving process at the client unit 20 in the SBC system.

FIG. 9 is a flowchart for a receiving process at the client unit 20 in the SBC system.

In a state where the server unit 10 is connected to the client unit 20 according to a request for login to the server unit 10 as a result of power activation of the client unit 20 (step R1) and the server unit 10 is in a reception standby state (step R2), if a signal is received, it is determined whether the type of the received signal is either keypad control information or screen update information (step R3).

If it has been determined that the signal received from the server unit 10 is keypad control information resulting from the change of the application program in operation, it is determined whether the keypad control information is either necessary keypad control information composed of the application ID, command ID, key display position, and key display contents prestored so as to correspond to the name of the application now in operation or unnecessary keypad control information unregistered (step R4).

If it has been determined that the keypad control information received from the server unit 10 is necessary keypad control information composed of the application ID "1", command IDs "1" to "7", key display positions "Left 1" to "Right 4", key display contents "New" to "End" corresponding to, for example, "Browser", the name of the application activated this time, the keypad control information is stored as display-operation setting data 24a into the RAM 24 and the keypad control flag 24b is set to On (step R5).

Then, according to the key display positions "Left 1" to "Right 4" and the key display contents "New" to "End" in the display-operation setting data 24a stored in the RAM 24, the key arrangement pattern in the switchable key display area 27a on the input unit (soft keyboard) 27 is switched to the Web browser command keys KB as shown by (B) in FIG. 7 (step R6).

If it has been determined that the keypad control information received from the server unit 10 is unnecessary keypad control information unregistered, the keypad control flag 24b is set to Off and the key arrangement pattern in the switchable key display area 27a on the input unit (soft keyboard) 27 is switched to the default kana input keys Km as shown by (B) in FIG. 4 (step R7).

If it has been determined in step R3 that the signal received from the server unit 10 is screen update information, the updated screen data G is developed on the frame buffer RAM 25, thereby displaying the developed data on the display unit 26 (step R8).

Figure 10:
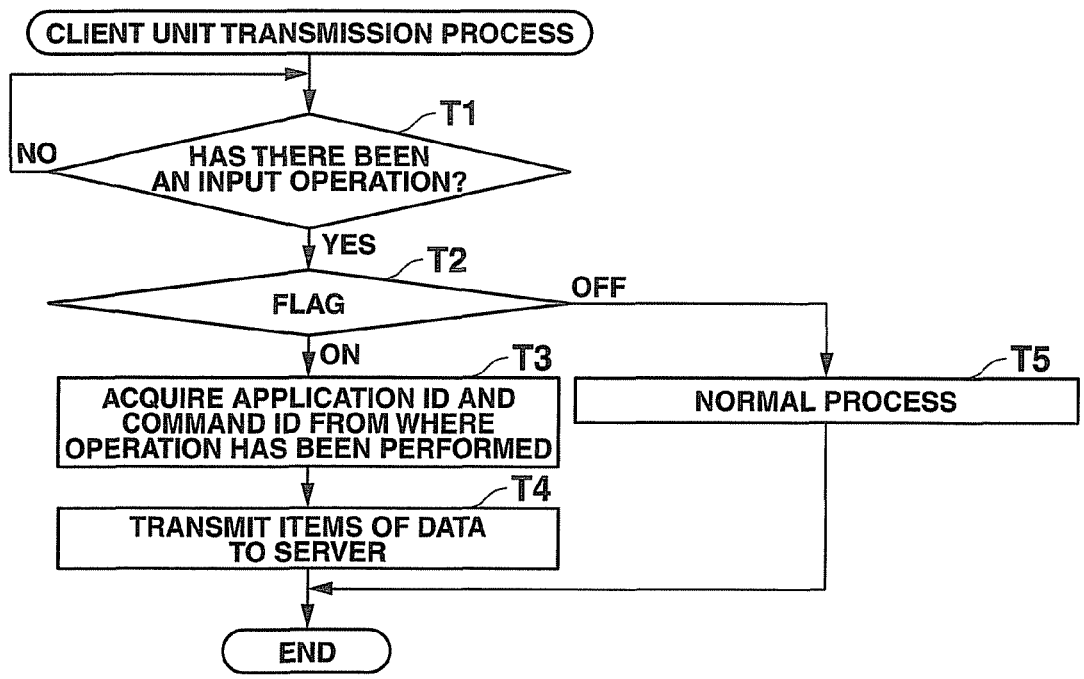
FIG. 10 is a flowchart for a transmitting process at the client unit 20 in the SBC system.

FIG. 10 is a flowchart for a transmitting process at the client unit 20 in the SBC system.

In the client unit 20, if it has been determined that there has been an input operation as a result of the user operation on the input unit (soft keyboard) 27 (step T1), it is determined whether the keypad control flag 24 in the RAM 24 has been set in either On or Off (step T2).

If it has been determined that the keypad control flag 24b in the RAM 24 is now set in On, or that the key arrangement pattern on the present input unit (soft keyboard) 27 is displayed on the basis of the display-operation setting data 24a resulting from the change of the application program in the server unit 10 (step T2 [On]), the application ID and command ID are read from the display-operation setting data 24a (application ID, command ID, key display positions, and key display contents) stored in the RAM 24 on the basis of the key positions input on the input unit (soft keyboard) 27 (step T3), and are transferred as an input event signal to the server unit 10 (step T4).

If it has been determined that the keypad control flag 24b in the RAM 24 is presently set to Off, or that the key arrangement pattern on the present input unit (soft keyboard) 27 is the default normal key arrangement pattern (see FIG. 4) displayed on the client unit 20 (step T2 [Off]), not the special key arrangement corresponding to the application program now running on the server unit 10, the key input signal from the input unit (soft keyboard) 27 is transmitted as an input event signal to the server unit 10 (step T5).

Accordingly, with the key arrangement switching control function of the client unit 20 corresponding to the operation application in the SBC system configured as described above, the ROM 13 of the server unit 13 is caused to store beforehand the display-operation setting database 13b which causes the application ID, command ID, key display positions, and key display contents to correspond to one another to define the key arrangement pattern on the input unit (soft keyboard) 27 of the client unit 20 according to the type of the application program running on the server unit 10. Then, if the application program running on the server unit 10 is changed according to the input event from the client unit 20, definition information on the key arrangement pattern corresponding to the operation application is read from the display-operation setting database 13b and transmitted to the client unit 20. Then, the key arrangement pattern displayed on the input unit (soft keyboard) 27 of the client unit 20 is switched to the key arrangement pattern corresponding to the operation application on the basis of the definition information received from the server unit 10 and a key signal (application ID+command ID) corresponding to the user operation based on the key arrangement pattern is transmitted to the server unit 10, thereby giving an instruction to process the operation application.

As described above, frequently-used commands are switched to a key arrangement pattern that enables direct key input on the input unit (soft keyboard) 27 in the SBC system, such as "Favorites", "Back" and "Move" when the Web browser program is run, or "New", "Save" and "Undo" when the text creation program is run. By doing this, even if the client unit 20 is particularly a small mobile terminal, various commands can be input easily by key operations without performing a pointer operation which is difficult to understand, troublesome, and liable to go wrong on the display screen.

(First Modification)

Figure 11:
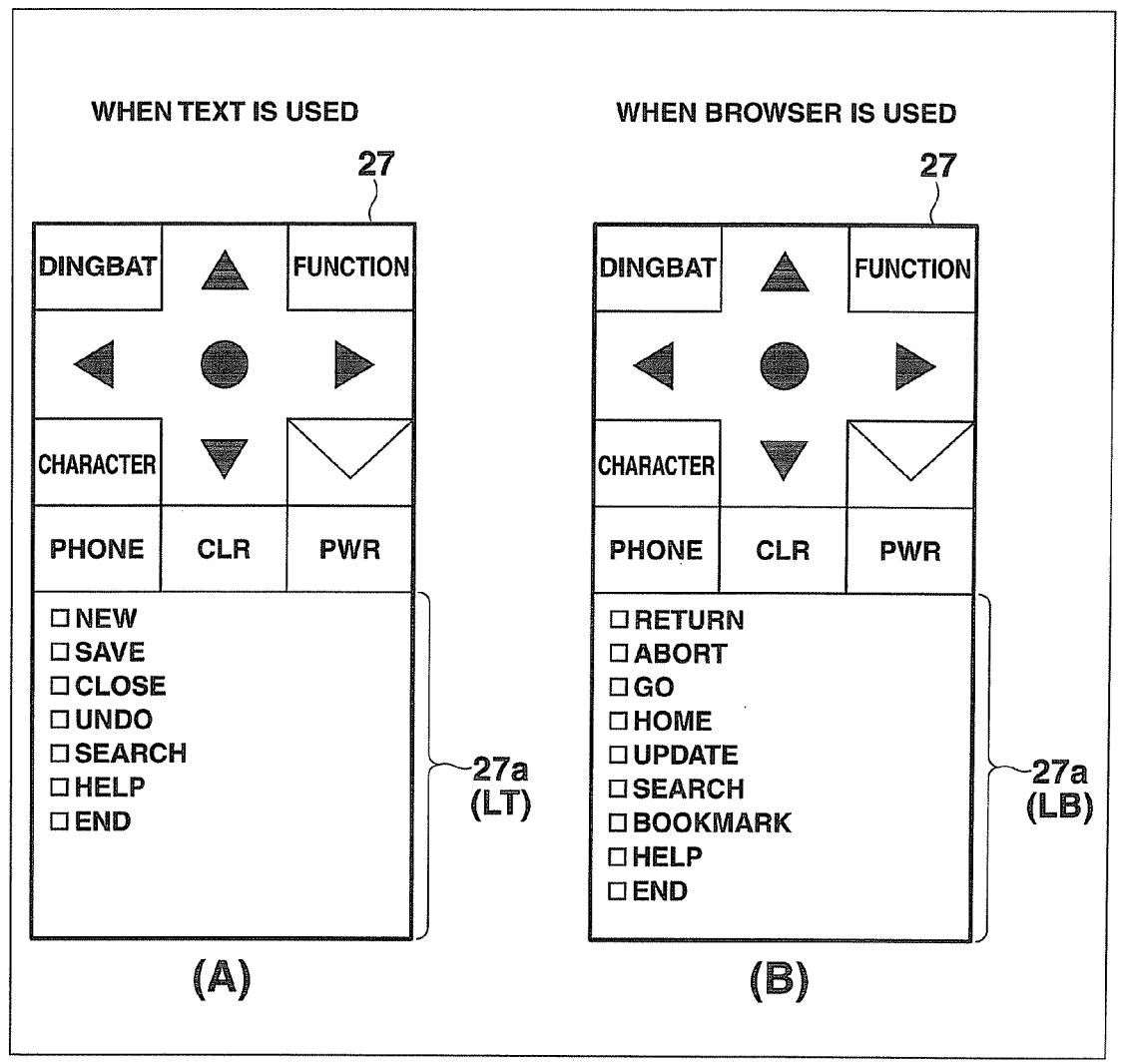
FIG. 11 shows a list key arrangement pattern switching display state on the input unit (soft keyboard) 27 of the client unit 20 whose display is controlled on the basis of the display-operation setting database 13b of the server unit 10.

FIG. 11 shows a list key arrangement pattern switching display state on the input unit (soft keyboard) 27 of the client unit 20 whose display is controlled on the basis of the display-operation setting database 13b of the server unit 10.

In the embodiment, the key arrangement pattern displayed in the switchable key display area 27a on the input unit (soft keyboard) 27 of the client unit 20 according to the operation application on the server unit 10 is configured to provide the keyboard-type text creation command keys KT or Web browser command keys KB as shown by (A) and (B) in FIG. 7, respectively.

In contrast, as shown by (A) and (B) in FIG. 11, the key arrangement pattern may be configured to provide list-type text creation command keys LT or Web browser command keys LB.

Furthermore, if the input unit 27 of the client unit 20 is not composed of a soft keyboard, the list-type text creation command keys LT or Web browser command keys LB shown by (A) and (B), respectively, in FIG. 11 may be displayed on the display unit 26 in the form of a pull-down menu, thereby providing a configuration which enables various commands corresponding to the operation applications to be input easily by selecting list-type keys in the pull-down menu.

(Second Modification)

In the embodiment, when the application program running on the server unit 10 has been changed according to the input event from the client unit 20, the special arrangement pattern which the user can operate easily in the new application program is substituted for the one now displayed on the input unit (soft keyboard) 27 of the client unit 20 on the basis of the display-operation setting database 13b.

In contrast, even when the same application program is running, a suitable key pattern which enables the user to operate easily according to the operating state may be set in the display-operation setting database 13b, which enables the pattern to be switched and displayed delicately.

The methods of the individual processes in the server-based computing system written in the embodiment, including the keypad control manager process at the server unit 10 shown in the flowchart of FIG. 8, the reception process at the client unit 20 shown in the flowchart of FIG. 9, and the transmission process at the client unit 20 shown in the flowchart of FIG. 10, can be stored in a medium of the external storage unit 18a (28a), such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the mediums can be delivered. The computer (control unit 11 [21]) of the server unit 10 or client unit (mobile terminal) 20 loads the program stored in the medium of the external storage unit 18a (28a) into the storage unit 13 (23). The computer is controlled by the read-in program, thereby realizing the key arrangement switching control function of the client unit 20 corresponding to the operation application explained in the embodiment, which enables the same processes in the aforementioned methods to be carried out.

Furthermore, the data of the programs which realize the above methods can be transferred in the form of program code through a communication network (N). The program data can be loaded from a computer unit (or a program server) connected to the communication network (N) into the storage unit 13 (23), thereby realizing the key arrangement switching control function of the client unit 20 corresponding to the operation application.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A client unit which transmits an input event corresponding to a user operation to a server unit connected via a network and receives screen information created according to an application program run on the server unit according to the input event, the client unit comprising:
a processor coupled with memory;
a key information reception module which receives key pad control information corresponding to an application program now in operation from the server unit;
a determination module which determines whether the key control information received by the key information reception module is specific key control information including exclusive key pad information inherently used in the application program or not;
a first key display control module which, if the received key control information is determined as the specific key control information by the determination module, displays as an input unit a key pad including a plurality of keys based on the exclusive key pad information included in the key control information;
a second key display control module which, if the received key control information is not determined as the specific key control information by the determination module, displays as an input unit a key pad including a plurality of keys based on common key pad information preliminarily stored in the client unit; and
a key operation signal transmission module which transmits, as an input event to the server unit, a key operation signal to be operated according to a user operation on any key of the key pad displayed by the first or second key display control module.

2. The client unit of claim 1, wherein
the exclusive key pad information is information of a plurality of exclusive keys used inherently in a corresponding application program, and includes key arrangement information, key name information of each key, and a key command, and
the key operation signal transmission module transmits each of an application ID indicating the application program now in operation and the key command corresponding to the key to be operated to the server unit as the key operation signal.

3. The client unit of claim 2, wherein
the key operation signal transmission module comprises a module which determines whether, when the user operation on any key is detected, the key pad displayed at the detection is the key pad based on the exclusive key pad information transmitted from the server unit or not, and the key operation signal transmission module transmits each of the application ID indicating the application program now in operation and the key command corresponding to the key to be operated as the key operation signal if it is determined that the displayed key pad is the key pad based on the exclusive key pad information, and transmits the key operations signal in the key pad based on the common key pad information if it is determined that the displayed key pad is not the key pad based on the exclusive key pad information.

4. The client unit of claim 1, wherein the common key pad information is key pad information indicating a plurality of character keys or key pad information indicating a plurality of number keys.

5. A server-based computing system having a server unit and a client unit connected thereto via a network, the server unit including
- a storage module which stores exclusive key pad information for displaying an input unit of the client unit for each type of application program,
- a first determination module which, if change of the application program is required by the client unit, determines whether exclusive key pad information corresponding to type of the changed application program is stored or not, and
- a key pad information transmission module which, if it is determined by the first determination module that the exclusive key pad information is stored, transmits the stored exclusive key pad information to the client unit, the client unit including
- a second determination module which determines whether the exclusive key pad information is transmitted from the server unit or not, according to the change of the application program,
- a key display control module which, if it is determined by the second determination module that the exclusive key pad information is transmitted, displays as an input unit a key pad including a plurality of keys based on the exclusive key pad information and, if it is determined by the second determination module that the exclusive key pad information is not transmitted, displays a key pad including a plurality of keys based on common key pad information preliminarily stored in the client unit, and
- a key operation signal transmission module which transmits to the server unit, a key operation signal to be operated according to a user operation on any key of the key pad displayed by the key display control module.

6. The server-based computing system of claim 5, wherein the exclusive key pad information stored in the storage module is information of a plurality of exclusive keys used inherently in a corresponding application program, and includes key arrangement information, key name information of each key, and a key command, and the key operation signal transmission module transmits each of an application ID indicating the application program now in operation and the key command corresponding to the key to be operated to the server unit as the key operation signal.

7. The server-based computing system of claim 6, wherein the key operation signal transmission module comprises a module which determines whether, when the user operation on any key is detected, the key pad displayed at the detection is the key pad based o the exclusive key pad information transmitted from the server or not, and the key operation signal transmission module transmits each of the application ID indicating the application program now in operation and the key command corresponding to the key to be operated as the key operation signal if it is determined that the displayed key pad is the key pad based on the exclusive key pad information, and transmits the key operation signal in the key pad based on the common key pad information if it is determined that the displayed key pad is not the key pad based on the exclusive key pad information.

8. The server-based computing system of claim 5, wherein the common key pad information is key pad information indicating a plurality of character keys or key pad information indicating a plurality of number keys.

9. The server-based computing system of claim 5, wherein
if it is determined by the first determination module that the exclusive key pad information is not stored, the key pad information transmission module transmits control information indicating that the exclusive key pad information is not stored, the second determination module determines that the exclusive key pad information is not transmitted, when the control information is received, and the key display control module displays the key pad including the plurality of keys based on the common key pad information preliminarily stored in the client unit when it is determined that the exclusive key pad information is not transmitted by receiving the control information.

10. A non-transitory computer readable medium which records the process of transmitting an input event corresponding to a user operation to a server unit connected via a network and receiving screen information created according to an application program run on the server unit according to the input event in the form of a program and from which a computer of a client unit is capable of reading instructions, the program comprising:
- a process of causing the computer to receive key pad control information corresponding to an application program now in operation from the server unit;
- a process of determining whether the received key control information is specific key control information including exclusive key pad information inherently used in the application program or not;
- a process of causing the computer to display as an input unit a key pad including a plurality of keys based on the exclusive key pad information included in the key control information;
- a process of causing the computer to display as an input unit a key pad including a plurality of keys based on common key pad information preliminarily stored in the client unit; and
- a process of causing the computer to transmit, as an input event to the server unit, a key operation signal to be operated according to a user operation on any key.

11. The non-transitory computer readable medium of claim 10, wherein
the exclusive key pad information is information of a plurality of exclusive keys used inherently in a corresponding application program, and includes key arrangement information, key name information of each key, and a key command, and the key operation signal transmission module transmits each of an application ID indicating the application program now in operation and the key command corresponding to the key to be operated to the server unit as the key operation signal.

12. The non-transitory computer readable medium of claim 11, wherein the key operation signal transmission module comprises a module which determines whether, when the user operation on any key is detected, the key pad displayed at the detection is the key pad based on the exclusive key pad information transmitted from the server unit or not, and the key operation signal transmission module transmits each of the application ID indicating the application program now in operation and the key command corresponding to the key to be operated as the key operation signal if it is determined that the displayed key pad is the key pad based on the exclusive key pad information, and transmits the key operation signal in the key pad based on the common key pad information if it is determined that the displayed key pad is not the key pad based on the exclusive key pad information.

13. The non-transitory computer readable medium of claim 10, wherein the common key pad information is key pad information indicating a plurality of character keys or key pad information indicating a plurality of number keys.

14. A method of controlling a server-based computing system having a server unit and a client unit connected thereto via a network, the method comprising:

storing exclusive key pad information for displaying an input unit of the client unit for each type of application program;

determining, if change of the application program is required by the client unit, whether exclusive key pad information corresponding to type of the changed application program is stored or not;

transmitting, if it is determined that the exclusive key pad information is stored, the stored exclusive key pad information to the client unit;

determining whether the exclusive key pad information is transmitted from the server unit or not, according to the change of the application program;

displaying as an input unit a key pad including a plurality of keys based on the exclusive key pad information if it is determined that the exclusive key pad information is transmitted, and displaying a key pad including a plurality of keys based on common key pad information preliminarily stored in the client unit if it is determined that the exclusive key pad information is not transmitted; and transmitting to the server unit a key operation signal to be operated according to a user operation on any key of the displayed key pad.

15. The method of claim 14, wherein the stored exclusive key pad information is information of a plurality of exclusive keys used inherently in a corresponding application program, and includes key arrangement information, key name information of each key, and a key command, and each of an application ID indicating the application program now in operation and the key command corresponding to the key to be operated is transmitted to the server unit as the key operation signal.

16. The method of claim 15, further comprising determining whether, when the user operation on any key is detected, the key pad displayed at the detection is the key pad based on the exclusive key pad information transmitted from the server unit or not, and transmitting each of the application ID indicating the application program now in operation and the key command correspond to the key to be operated as the key operation signal if it is determined that the displayed key pad is the key pad based on the exclusive key pad information, and transmitting the key operation signal in the key pad based on the common key pad information if it is determined that the displayed key pad is not the key pad based on the exclusive key pad information.

17. The method of claim 14, wherein the common key pad information is key pad information indicating a plurality of character keys or key pad information indicating a plurality of number keys.

* * * * *